United States Patent [19]

Kanemura et al.

[11] Patent Number: 4,791,185
[45] Date of Patent: Dec. 13, 1988

[54] HIGH-REFRACTIVITY PLASTIC LENS RESIN FORMED FROM A POLYISOCYANATE AND A POLYTHIOL

[75] Inventors: Yoshinobu Kanemura; Katsuyoshi Sasagawa; Masao Imai, all of Yokohama; Teruyuki Nagata, Ohmuta; Nobuyuki Kajimoto, Yokohama, all of Japan

[73] Assignee: Mitsui Toatsu Chemicals, Incorporated, Tokyo, Japan

[21] Appl. No.: 116,959

[22] Filed: Nov. 5, 1987

[30] Foreign Application Priority Data

Nov. 21, 1986 [JP] Japan ................................. 61-276791

[51] Int. Cl.[4] ...................... C08G 18/28; C08G 18/77; C08G 18/32
[52] U.S. Cl. ......................................... 528/73; 528/77
[58] Field of Search ..................... 528/73, 77

[56] References Cited

U.S. PATENT DOCUMENTS

| 4,342,863 | 8/1982 | Hohokabe et al. | 528/364 |
| 4,530,941 | 7/1985 | Turner et al. | 528/73 |
| 4,587,322 | 5/1986 | Rasshofer et al. | 528/73 |
| 4,689,387 | 8/1987 | Kajimoto et al. | 528/76 |

Primary Examiner—Harold D. Anderson
Assistant Examiner—Dennis R. Daley
Attorney, Agent, or Firm—Oblon, Fisher, Spivak, McClelland & Maier

[57]     ABSTRACT

Disclosed herein is a colorless transparent plastic lens having high refractivity and low dispersion. The lens is light, has heat resistance sufficient for post processing, and is excellent in grinding machinability and impact resistance. It is made of a sulfur-containing urethane resin, which is a polymer of a specific polythiol and a particular polyisocyanate of at least bifunctionality.

14 Claims, No Drawings

HIGH-REFRACTIVITY PLASTIC LENS RESIN FORMED FROM A POLYISOCYANATE AND A POLYTHIOL

BACKGROUND OF THE INVENTION (1) Field of the Invention:

This invention relates to a plastic lens resin having a high refractive index (hereinafter may also be called "refractivity"), low dispersion, and excellent heat resistance.

(2) Description of the Prior Art:

Plastic lenses have been finding utility as eye lenses and camera lenses and in optical devices in recent years since they are lighter, less fragile and dyeable compared with inorganic lenses.

As a resin employed widely for these purposes, there is a resin obtained by subjecting diethylene glycol bisallylcarbonate to radical polymerization. Its refractive index is however small ($n_D = 1.50$) compared with inorganic lenses ($n_D = 1.52$). In order to achieve optical characteristics equivalent to the inorganic lenses, it is necessary to increase the curvature of a lens so that the central thickness and peripheral thickness of the lens increase and the overall thickness of the lens hence becomes greater unavoidably. There is thus an outstanding demand for the development of a lens resin having a higher refractive index in order to overcome this inconvenience. It has therefore been proposed to introduce one or more aromatic rings, chlorine atoms or bromine atoms in the chemical structures of various monomers. The introduction of one or more aromatic rings alone can however hardly achieve a high refractive index, whereas the sole introduction of one or more halogen atoms results in a greater specific gravity and impairs the advantageous light weight feature of plastic lenses.

Since high refractivity, low dispersion and low specific gravity can be expected from the introduction of one or more sulfur atoms into the chemical structure of a monomer, sulfur-containing urethane resins have been proposed (Japanese Patent Laid-Open Nos. 194401/1985 and 217229/1985). These sulfur-containing urethane resins are however inferior in heat resistance to conventional radical-polymerization olefin resins, they are susceptible to deformations upon post processing such as lens dyeing and surface coating so that the processing temperature must be controlled low during such post processing. A limitation is hence imposed on their wide-spread use.

SUMMARY OF THE INVENTION

With the foregoing in view, the present inventors have carried out an extensive investigation on various polyols and polythiols having at least trifunctionality in order to find out monomers capable of providing sulfur-containing urethane resins which have heat resistance sufficient to withstand heating conditions in post processing such as dyeing and surface coating while maintaining good physical properties as lenses such as high refractivity, low dispersion and low specific gravity. As a result, it has been found that the above object can be achieved by polymerizing, with at least one polyisocyanate having at least bifunctionality, at least one polythiol represented by the following general formula:

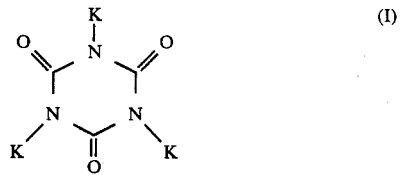

wherein K is a substituent $-CH_2+(CHR)_m(O)_n(CO)_p(CH_2)_q-SH$ in which R means a hydrogen atom or methyl group, m stands for an integer of 0-3, n for an integer of 0-1, p for an integer of 0-1 and q for an integer of 1-3, leading to completion of the present invention. The term "at least bifunctionality" as used herein means either bifunctionality or any higher functionality".

The present invention therefore provides a high-refractivity plastic lens resin obtained by polymerizing at least one polythiol, which is represented by the general formula (I), with at least one polyisocyanate of at least bifunctionality and having high refractivity, low dispersion and low specific gravity and excellent heat resistance and a lens produced by using the resin.

The lens resin of this invention is colorless and transparent, has high refractivity, low dispersion and low specific gravity, and does not undergo deformations even when heated upon post processing such as dyeing and surface coating. It is therefore suitable as eye lenses and camera lenses and as a resin useful in other optical devices.

DETAILED DESCRIPTION OF THE INVENTION AND PREFERRED EMBODIMENTS

As illustrative examples of the polythiol of the general formula (I) useful in the practice of this invention, may be mentioned tris(2-mercaptoethyl) cyanurate, tris(3-mercapto-n-propyl) isocyanurate, tris(2-methyl-3-mercapto-n-propyl) isocyanurate, tris(mercaptomethyl) isocyanurate, the mercaptopropionate of tris(2-hydroxyethyl)isocyanuric acid, the mercaptoacetate of tris(2-hydroxyethyl)isocyanuric acid, the mercaptopropionate of tris(hydroxymethyl)isocyanuric acid, the mercaptoacetate of tris(hydroxymethyl)isocyanuric acid, etc.

On the other hand, as exemplary polyisocyanates which have at least bifunctionality and are useful in the practice of this invention, may be mentioned xylylene diisocyanate, nucleus-chlorinated xylylene diisocyanates, $\alpha,\alpha,\alpha',\alpha'$-tetramethylxylylene diisocyanate (hereinafter abbreviated as "tetramethylxylylene diisocyanate"), hexamethylene diisocyanate, isophorone diisocyanate, tolylene diisocyanate, 4,4'-diphenylmethane diisocyanate, the biuret reaction product of hexamethylene diisocyanate, the adduct reaction product of hexamethylene diisocyanate and trimethylolpropane, the trimer (isocyanurate) of hexamethylene diisocyanate, methylcyclohexane diisocyanate, 4 4'-dicyclohexylmethane diisocyanate, ethyl lysine isocyanate-$\beta$-isocyanate, etc. In view of the weatherability of the resulting resins, preferred are aromatic isocyanates obtained by substituting one or more isocyanate groups for the corresponding number of alkyl groups as side chains of an aromatic ring, such as xylene diisocyanate and tetramethylxylylene diisocyanate; and aliphatic isocyanates such as isophorone diisocyanate, methylcyclohexane diisocyanate and hexamethylene diisocyanate.

In the present invention, said at least one polyisocyanate having at least bifunctionality and said at least one polythiol represented by the general formula (I) may be used at a ratio in a range of 0.5–3.0, preferably, 0.5–1.5 in terms of NCO/SH molar ratio (which means the ratio of —NCO groups of the polyisocyanate to —SH groups of the polythiol; this will apply to all subsequent molar ratios).

In order to increase the crosslinking degree of the polymer (resin), the present invention also allows to incorporate one or more polyols and/or polythiols such as pentaerythritol, trimethylolpropane, pentaerythritol tetrakis(thioglycolate), pentaerythritol tetrakis(mercaptopropionate), trimethylolpropane tris(mercaptopropionate), trimethylolpropane tris(thioglycolate) and pyrogallol. In this case, the amount of the polyisocynate is increased to maintain the NCO/(SH+OH) molar ratio within a range of 0.5–3.0, preferably, 0.5–1.5 as calculated on the basis of the whole monomers.

It may also be feasible in the present invention to mix one or more polythiols having an aromatic ring, such as xylylene dithiol, benzene dithiol and toluene dithiol, their nucleus-halogenated derivatives, bismuthiol, or the like. In this case, the amount of the polyisocyanate is increased to maintain the NCO/SH molar ratio within a range of 0.5–3.0, preferably, 0.5–1.5 as calculated on the basis of the whole monomers.

In the present invention, a catalyst such as dibutyltin laurate, dimethyltin chloride or lead 2-ethylhexanoate may be added in an amount of 0.01–1.0 wt. %. It may also be feasible in the present invention to add suitably one or more additives such as ultraviolet ray absorbent, oxidation inhibitor, coloring inhibitor and/or fluorescent dye as needed in order to maintain physical properties of the resultant resin. For the production of the lens resin of this invention, at least one polythiol represented by the general formula (I), at least one polyisocyanate having at least bifunctionality, and if necessary, a crosslinking agent such as the above-mentioned polyol or polythiol, a polythiol having an aromatic ring such as xylylene dithiol, etc. are mixed. The resultant mixture is then processed by a known cast-molding technique, namely, is poured into a mold formed in combination of a glass or metal mold, which has beforehand been treated with a parting agent, and a TEFLON (trade mark), polyethylene or polyvinyl chloride gasket, followed by its heating and curing.

The reaction temperature and reaction time vary depending on the kinds of monomers to be used but may generally be −20° C.–150° C. and 0.5 hour–72 hours respectively.

EXAMPLES

The present invention will hereinafter be described in more detail by the following Examples, in which all designations of "part" or "parts" mean part or parts by weight. The refractive index, Abbe number, lens polishing machinability, impact resistance and dyeability of a lens resin obtained in each of the following Examples were measured or determined respectively in accordance with the following testing methods.

Refractive index and Abbe number:
Measured at 20° C. by means of a Pulfrich refractometer.

Lens polishing machinability:
The resin was ground and polished by a eyeglass lens polisher. The machinability is rated good (O) where the thus-polished surface was good, whereas the machinability is rated poor (X) where the polisher was loaded and the grinding and polishing were no longer feasible.

Impact resistance:
Using a flat plate having a central thickness of 2 mm, a falling ball impact test was conducted in accordance with the FDA standards. The impact resistance is rated good (O) where the flat plate did not shatter.

Dyeability:
In 300 parts of water, were dispersed 0.9 part of "Miketon Polyester Red FB" (trade name; product of Mitsui-Toatsu Dyes, Inc.), 0.1 part of dialkyl sulfosuccinate and 0.1 part of the sodium salt of a condensation product of β-naphthalenesulfonic acid and formaldehyde, followed by an addition of 1.5 parts of "Tetromin OEN" (trade name for an orthophenylphenol type carrier; product of Yamakawa Chemical Ind. Co., Ltd.) as a carrier. The resulting mixture was heated to 85° C. under thorough stirring. Lenses were immersed in the thus-prepared dye bath. After maintaining the lenses at the same temperature for 10 minutes, they were pulled out of the dye bath and then washed thoroughly with water. Those colored in a red color were rated good (O) while those not colored were rated poor (X).

Heat resistance:
Test pieces were separately heated at a rate of 2.5° C./min under a load of 5 g by means of a "Thermomechanical Analyzer" (trade name; manufactured by Parkin-Elmer Company, U.S.A.) to measure their heat-distortion starting temperatures.

EXAMPLE 1

Mixed into a uniform liquid were 188 parts of m-xylylene diisocyanate, 234 parts of tris(3-mercapto-n-propyl) isocyanurate and 0.1 part of dibutyltin dilaurate. The homogeneous liquid was poured into a mold composed of a glass mold, which had been treated with a silicone parting agent of the baking type, and a polyethylene gasket. After heating the homogeneous liquid at 55° C. for 3 hours, at 60° C. for 2 hours, at 80° C. for 1 hour and then at 90° C. for 1 hour, the mold was cooled to release the resultant lens. Its refractive index ($\eta^{20}$), Abbe number and specific gravity were 1.615, 34 and 1.33 respectively. The lens had good polishing machinability, impact resistance and dyeability. Its heat-distortion starting temperature was 120° C.

EXAMPLES 2-15

Following the procedure of Example 1, lenses were produced separately from the compositions given in Table 1. Test results are also shown in the same table.

COMPARATIVE EXAMPLE 1

Without using any isocyanurate compound of the general formula (I), 222 parts of isophorone diisocyanate, 244 parts of pentaerythritol tetrakis(mercaptopropionate) and 0.3 part of dibutyltin dilaurate were mixed into a uniform liquid. The homogeneous liquid was poured into a mold composed of a glass mold, which had been treated with a silicone parting agent of the baking type, and a polyester gasket. After heating the homogeneous liquid at 55° C. for 3 hours, at 60° C. for 2 hours, at 80° C. for 1 hour and then at 90° C. for 1 hour, the mold was cooled to release the resultant lens. Its refractive index ($\eta^{20}$), Abbe number and specific gravity were 1.55, 44 and 1.32 respectively. The lens had good polishing machinability, impact resistance and dyeability but its heat-distortion starting temperature was as low as 90° C.

Comparative Example 1. Test results are also shown in the same table.

TABLE 1

| Ex. | Polythiol of the general formula (I), mole | Isocyanate (mole) | Additive (mole) | Refractive index, n | Abbe number | Specific gravity | Machinability | Impact resistance | Dyeability | Heat resistance (C.) |
|---|---|---|---|---|---|---|---|---|---|---|
| 1 | Tris(3-mercapto-n-propyl)isocyanurate (0.67) | m-XDI[1] (1.0) | — | 1.62 | 34 | 1.33 | O | O | O | 110 |
| 2 | Tris(3-mercapto-n-propyl)isocyanurate (0.67) | m-XDI (0.5) IPDI[2] (0.5) | — | 1.59 | 39 | 1.32 | O | O | O | 125 |
| 3 | Tris(3-mercapto-n-propyl)isocyanurate (0.33) | m-XDI (1.0) | m-XDT[10] (0.5) | 1.64 | 32 | 1.33 | O | O | O | 108 |
| 4 | N,N',N''—tris(mercaptoethylcarbonyloxyethyl)-isocyanurate (0.33) | HMDI[3] (1.0) | PETTG[11] (0.5) | 1.56 | 45 | 1.31 | O | O | O | 105 |
| 5 | N,N',N''—tris(mercaptomethylcarbonyloxyethyl)-isocyanurate (0.33) | m-XDI (1.0) | BDT[12] (0.5) | 1.63 | 34 | 1.33 | O | O | O | 110 |
| 6 | N,N',N''—tris(mercaptomethylcarbonyloxyethyl)-isocyanurate (0.33) | IPDI (0.5) m-XDI (0.5) | m-XDT (0.3) 2,4,5,6-TCXDT[13] (0.2) | 1.60 | 36 | 1.38 | O | O | O | 130 |
| 7 | N,N',N''—tris(mercaptomethylcarbonyloxyethyl)-isocyanurate (0.67) | 4,4'-DPMDI[4] (1.0) | — | 1.63 | 32 | 1.32 | O | O | O | 124 |
| 8 | Tris(2-mercaptoethyl)isocyanurate (0.4) | m-XDI (1.0) | PETMP[14] (0.4) | 1.61 | 35 | 1.31 | O | O | O | 120 |
| 9 | Tris(3-mercapto-n-propyl)isocyanurate (0.4) | TDI[5] (1.0) | TMP[15] (0.5) | 1.60 | 38 | 1.32 | O | O | O | 135 |
| 10 | Tris(3-mercapto-n-propyl)isocyanurate (0.4) | m-XDI (0.4) IPDI (0.6) | BDT (0.6) | 1.63 | 33 | 1.33 | O | O | O | 112 |
| 11 | Tris(3-mercapto-n-propyl)isocyanurate (0.4) | MCHDI[6] (1.0) | m-XDT (0.5) UV absorbent 0.1 wt. % | 1.62 | 34 | 1.32 | O | O | O | 123 |
| 12 | N,N',N'''-tris(mercaptomethylcarbonyloxyethyl)-isocyanurate (0.67) | MCHDI (1.0) | — | 1.57 | 43 | 1.30 | O | O | O | 115 |
| 13 | N,N',N''—tris(mercaptomethylcarbonyloxyethyl-isocyanurate (0.5) | LTI[7] (1.0) | m-XDT (0.75) | 1.59 | 39 | 1.32 | O | O | O | 105 |
| 14 | Tris(2-mercaptoethyl)isocyanurate (0.33) | 4,4'-DCHMDI[3] (1.0) | PETTG (0.5) | 1.58 | 43 | 1.31 | O | O | O | 126 |
| 15 | Tris(3-mercapto-n-propyl)isocyanurate (0.67) | TMXDI[9] (1.0) | — | 1.59 | 37 | 1.32 | O | O | O | 120 |
| Comp. Ex. 1 | — | IPDI (1.0) | PETMP (0.5) | 1.55 | 44 | 1.32 | O | O | O | 90 |
| Comp. Ex. 2 | — | m-XDI (1.0) | PETMP (0.5) | 1.59 | 36 | 1.31 | O | O | O | 84 |
| Comp. Ex. 3 | — | — | MMA[16] (1.0) DEGBMA[17] (0.5) | 1.50 | 51 | 1.34 | O | X | X | 115 |
| Comp. Ex. 4 | — | m-XDI (1.0) | m-XDT (0.3) PETMP (0.35) | 1.64 | 31 | 1.32 | O | O | O | 75 |

[1]m-Xylene diisocyanate.
[2]Isophorone diisocyanate.
[3]Hexamethylene diisocyanate.
[4]4,4'-Diphenylmethane diisocyanate.
[5]Tolylene diisocyanate.
[6]Methylcyclohexane diisocyanate.
[7]Lysine triisocyanate.
[8]4,4'-Dicyclohexylmethane diisocyanate.
[9]Tetramethylxylylene diisocyanate.
[10]m-Xylylenedithiol.
[11]Pentaerythritol tetrakis(thioglycolate).
[12]Benzenedithiol.
[13]2,4,5,6-Tetrachloroxylylenedithiol.
[14]Pentaerythritol tetrakis(mercaptopropionate).
[15]Trimethylol propane.
[16]Methyl methacrylate.
[17]Diethylene glycol bis(methacrylate).

COMPARATIVE EXAMPLES 2-4

Without using any isocyanurate compound of the general formula (I), lenses were produced separately by using m-xylylene diisocyanate, namely, from the compositions given in Table 1 in the same manner as in

We claim:
1. A high-refractivity plastic lens resin obtained by polymerizing, with at least one polyisocyanate of at least bifunctionality, at least one polythiol represented by the general formula (I):

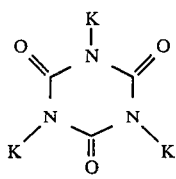

(I)

wherein K is a substituent —CH$_2$—(CHR)$_m$(O)$_n$-(CO)$_p$(CH$_2$)$_q$SH in which R represents a hydrogen atom or methyl group, m is an integer of 0-3, n is an integer of 0-1, p is an integer of 0-1 and q is an integer of 1-3.

2. The high-refractivity plastic lens resin as claimed in claim 1, wherein the polythiol is tris(3-mercapto-n-propyl) isocyanurate.

3. The high-refractivity plastic lens resin as claimed in claim 1, wherein the polyisocyanate is xylylene diisocyanate.

4. The high-refractivity plastic lens resin as claimed in claim 1, wherein the polyisocyanate is α,α,α',α'-tetramethylxylylene diisocyanate.

5. The high-refractivity plastic lens resin as claimed in claim 1, wherein the polyisocyanate is isophorone diisocyanate.

6. The high-refractivity plastic lens resin as claimed in claim 1, wherein the polyisocyanate is methylcyclohexane diisocyanate.

7. A lens comprising a copolymer obtained by polymerizing under heat at least one polythiol, which is represented by the following general formula (I):

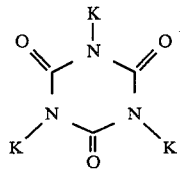

(I)

wherein K is a substituent —CH$_2$(CHR)$_m$(O)$_n$-(CO)$_p$(CH$_2$)$_q$SH in which R represents a hydrogen atom or methyl group, m is an integer of 0-3, n is an integer of 0-1, p is an integer of 0-1 and q is an integer of 1-3, with at least one polyisocyanate of at least bi-functionality.

8. The lens as claimed in claim 7, wherein the ratio of the polyisocyanate to the polythiol is 0.5-3.0 per NCO/SH molar ratio.

9. The lens as claimed in claim 8, wherein the ratio of the polyisocyanate to the polythiol is 0.5-1.5 per NCO/SH molar ratio.

10. The lens as claimed in claim 7, wherein a polyol is additionally polymerized and the ratio of the polyisocyanate to the polythiol and polyol is 0.5-3.0 per NCO/(SH +OH) molar ratio.

11. The lens as claimed in claim 10, wherein the ratio of the polyisocyanate to the polythiol and polyol is 0.5-1.5 per NCO/(SH+OH) molar ratio.

12. The lens as claimed in claim 7, wherein at least one of the polythiols has an aromatic ring or nucleus-halogenated aromatic ring, and the ratio of the polyisocyanate to the polythiol is 0.5-3.0 per NCO/SH molar ratio as calculated based on the whole monomers.

13. The lens as claimed in claim 12, wherein the ratio of the polyisocyanate to the polythiol is 0.5-1.5 per NCO/SH molar ratio.

14. The lens as claimed in claim 7, wherein at least one of the polythiols is bismuthiol, and the ratio of the polyisocyanate to the polythiol is 0.5-3.0 per NCO/SH molar ratio as calculated based on the whole monomers.

* * * * *